United States Patent [19]

Beyer

[11] Patent Number: 5,752,591

[45] Date of Patent: May 19, 1998

[54] PLUG-IN HYDRAULIC CYLINDER HOUSING FOR HYDRAULICALLY ACTUATED CLUTCH

[75] Inventor: Charles E. Beyer, Clinton Township, Mich.

[73] Assignee: Meritor Heavy Vehicle Systems, LLC, Troy, Mich.

[21] Appl. No.: 621,928

[22] Filed: Mar. 26, 1996

[51] Int. Cl.⁶ .................................... F16D 25/08
[52] U.S. Cl. ................. 192/85 C; 192/91 R; 192/98; 192/110 B
[58] Field of Search ................. 192/85 C, 98, 192/110 B, 91 R

[56] References Cited

U.S. PATENT DOCUMENTS

| | | | |
|---|---|---|---|
| 4,579,203 | 4/1986 | Link | 192/98 X |
| 4,991,702 | 2/1991 | Ladin | 192/85 C |
| 5,335,764 | 8/1994 | Leitner et al. | 192/85 C |

*Primary Examiner*—Rodney H. Bonck
*Assistant Examiner*—Saúl J. Rodríguez

[57] ABSTRACT

A hydraulically actuated clutch includes a pair of hydraulic cylinder housings formed as blocks bolted to the clutch housing. In a most Preferred embodiment, the hydraulic cylinder housing extends into an opening in tie side wall of the outer clutch housing and is bolted at an outer location to the transmission bell housing. A fluid connection is made at an outer surface such that an assembler need not reach into the transmission bell housing to make the fluid connections. The hydraulic cylinder housing preferably has a machined piston bore, and fluid passages communicating the piston bore to the connection at the outer location on the hydraulic cylinder housing. In a second embodiment, a hydraulic cylinder housing also includes a block having a machined piston bore and fluid passage, however the block is bolted to an internal surface in the outer clutch housing. The improved hydraulic cylinder housings simplify assembly of the hydraulic cylinder housings to the clutch, and also simplify the connection of the hydraulic fluid.

17 Claims, 5 Drawing Sheets

PLUG-IN HYDRAULIC CYLINDER HOUSING FOR HYDRAULICALLY ACTUATED CLUTCH

BACKGROUND OF THE INVENTION

This invention relates to a hydraulic cylinder housing which includes a machined bore that receives a piston. The hydraulic cylinder housing may be plugged into a clutch housing such that the connection of the hydraulic cylinders is simplified over the prior art.

Clutch mechanisms are utilized to selectively bring a source of drive and a driven shaft into and out of contact. In standard clutches, a mechanical linkage interconnects an operator pedal to the clutch. While these linkages have been widely accepted, there are some drawbacks to mechanical linkages. Drawbacks include the level of maintenance required for the mechanical linkages, and their reliability after normal wear and tear. The linkages may change relative locations with use, and frequent maintenance is required. Also, as the relative positions of the various linkage members change, the reliability of the clutch actuation changes. Moreover, mechanical linkages carry a relatively high friction load.

Although less widely utilized, hydraulically actuated clutches have also been proposed. In a hydraulically actuated clutch, an operator pedal selectively actuates hydraulic cylinders to power pistons and move a clutch bearing to bring the clutch members into and out of contact. While hydraulically actuated clutches address the above deficiencies in mechanical linkages, they do have some drawbacks of their own. In one drawback, it has been relatively complicated to mount the hydraulic cylinder housings within the transmission bell housing, and to supply the required fluid connections.

SUMMARY OF THE INVENTION

In a disclosed embodiment of this invention, the hydraulic cylinder housing is a single machined block which simplifies the attachment of the hydraulic cylinder housing to the transmission bell housing, and also simplifies the connection of the required fluid lines. In one embodiment, the machined block includes a machined bore which receives the piston. The piston is received directly within the machined bore, and no liner or other structure is required. In addition, the block has internal passages which selectively communicate hydraulic fluid to drive the piston into and out of the cylinder. Preferably, a second path leads to a vent valve allowing air to vent outwardly of the cylinder as required.

In a most preferred embodiment of this invention, the block includes a flange or shoulder which abuts an outer face of the transmission bell housing. The block moves into an opening in the side wall of the transmission bell housing, and is bolted to the outer wall of the clutch. The outer face of the transmission bell housing is machined to insure that the block is properly positioned. In addition, two shoulder bolts are utilized to secure the block to the transmission bell housing. This also insures proper positioning. Together, these features insure that the piston axis is parallel to the central shaft axis.

Preferably, the hydraulic connection may then be connected to a connection outward of this shoulder, and the passage within the housing supplies the hydraulic fluid to the piston cylinder. Thus, the connection of the hydraulic cylinder housing is greatly simplified, as is the attachment of the required fluid lines.

A second embodiment hydraulic cylinder housing is bolted to an inner wall of the transmission bell housing, but still includes the machined piston bore and internal flow passages. This hydraulic cylinder housing and its inclusion of its machined passages greatly simplifies the connection of the required fluid lines and hydraulic cylinder housing to the transmission bell housing.

These and other features of the present invention will be best understood from the following specifications and drawings, of which the following is a brief description.

DETAILED DESCRIPTION OF THE PREFERRED EMBODIMENT

Figure 1:
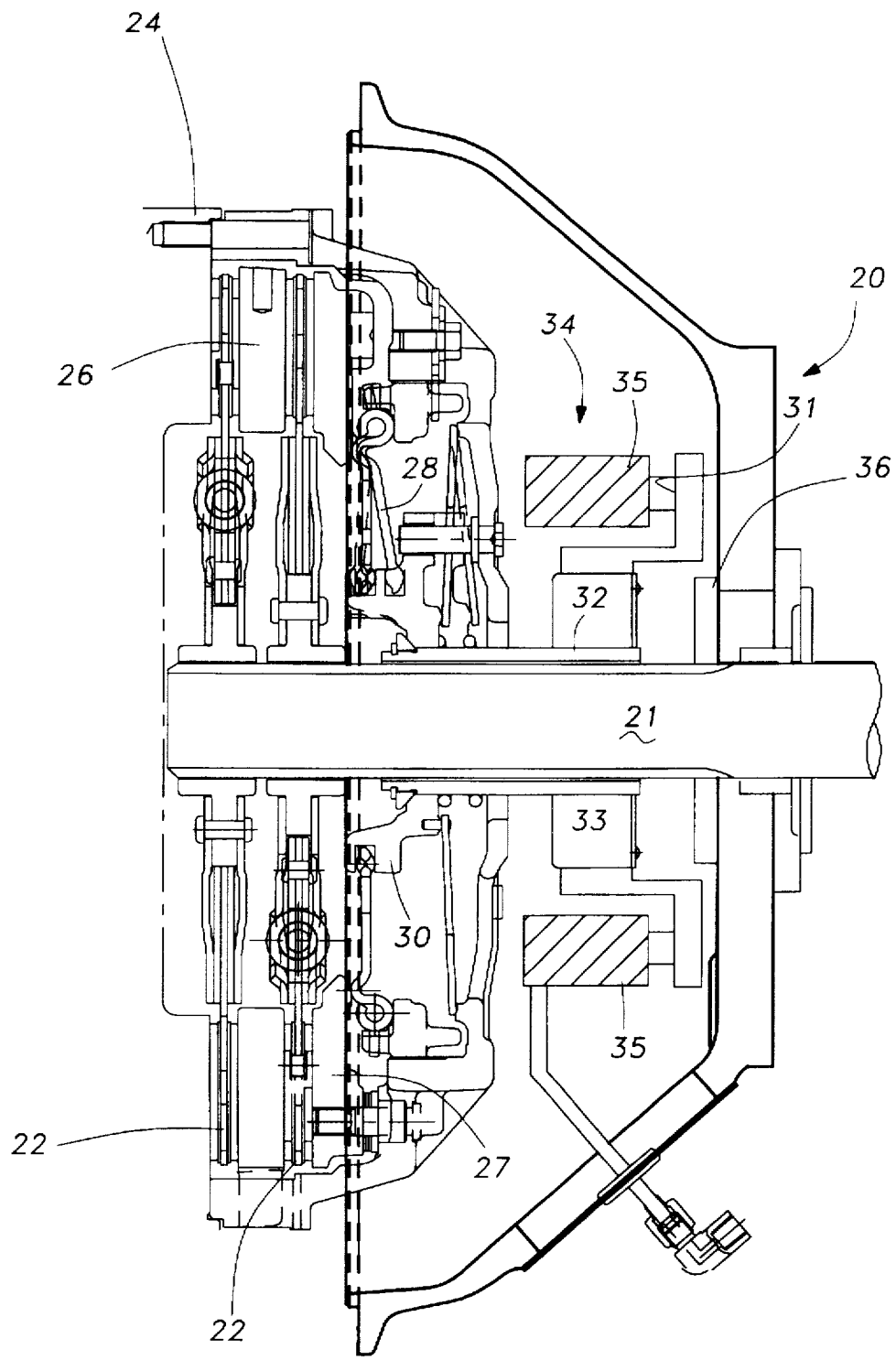
FIG. 1 is a schematic view showing a standard hydraulic clutch.

FIG. 1 schematically shows a standard hydraulically actuated clutch 20. As shown, a pair of clutch disks 22 rotate with a shaft 21. The disks 22 are selectively driven to rotate with a rotating clutch housing 24. Rotating clutch housing 24 is connected to be driven by the engine flywheel. An intermediate plate 26 is selectively brought into and out of contact with the disks 22 to transmit rotation. Additional disks and plates may also be utilized to help connect the plates and disks together for driving. A pusher plate 27 selectively squeezes the plates and disks together to transmit rotation. A lever 28 move, the pusher plate 27 to selectively bring the disks and plates into contact. A moving sleeve 30 moves the lever 28 to move the pusher plate 27 between the contact non-contact positions. A tubular sleeve 32 extends rearwardly from the sleeve 30 to an actuation structure 34. As shown, actuation structure 34 includes a clutch bearing 33 selectively driven by hydraulic cylinders 35 axially to the left and right as shown in this figure. The mounting of the cylinder is shown schematically. In the prior art, complex mounting arrangements have been used. As shown, a spring drives the sleeve 30 in a first direction unless the sleeve is moved in an opposed direction under the influence of the hydraulic pistons. When the pistons are within their cylinders, they do not move the clutch bearing to the left as shown in this figure. The disks and plates are then held in contact and drive is transmitted. However, when the pistons move the clutch bearing 33 to the right as shown in this figure, the disks 22 are no longer driven by the plates. In this instance, rotation is no longer transmitted to the shaft 21. As also shown, a clutch brake member 36 is positioned on shaft 21. The clutch bearing 33 is brought into contact with clutch brake 36, under certain conditions.

Figure 2A:
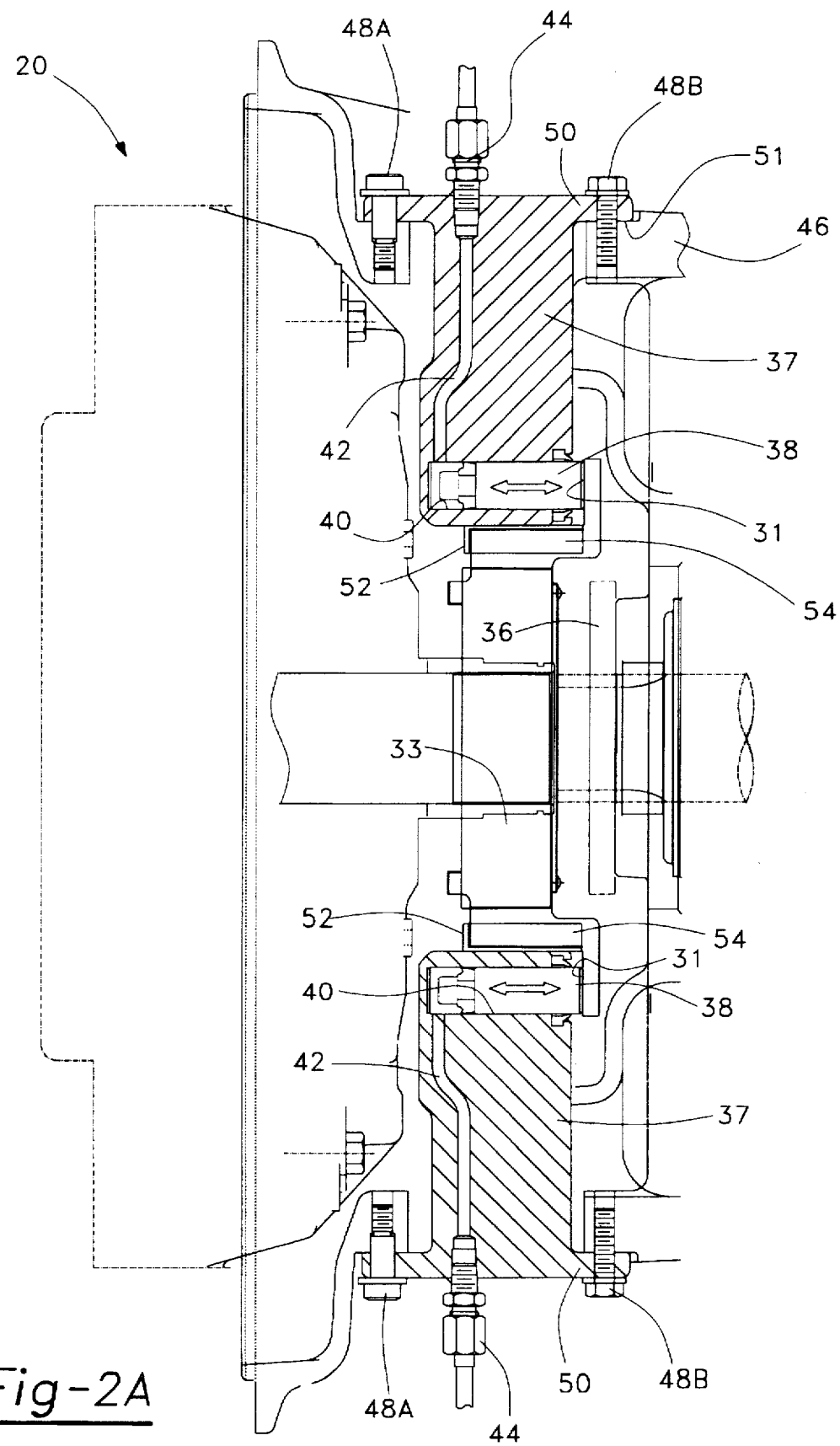
FIG. 2A is a cross-sectional view showing a first embodiment of the inventive hydraulic clutch.

As shown in FIG. 2A, in one inventive aspect of this invention, the hydraulic cylinders are received within a hydraulic cylinder housing 37. Pistons 38 move within a machined cylinder bore 40 and contact piston contact surfaces 31 on clutch plate 33. The piston bore 40 is cast or machined into a one-piece housing 37, and no liner or other structure is required. A fluid passage 42 is cast or machined within the housing 37 to supply hydraulic fluid from a connection 44 to the bore 40. Thus, all fluid connections are internal, and are easily and reliably completed.

As shown, the outer transmission bell housing 46 has the hydraulic cylinder housing 37 connected to a side wall by bolts 48A and 48B. The bolts 48A and 48B extend through a shoulder 50 received with a partially countersunk bore 51 about openings in the outer side wall of the transmission bell housing 46.

An anti-rotation surface 52 on the housing 37 guides a mating surface 54 on the clutch bearing 33. As described in more detail in co-pending patent application Ser. No. 08/621,927 entitled "Reaction Surfaces for Hydraulically Activated Clutches" and filed on even date with this application, these guiding surfaces provide benefits in preventing rotation of the clutch plate, particularly when brought into contact with the clutch brake 36.

Figure 2B:
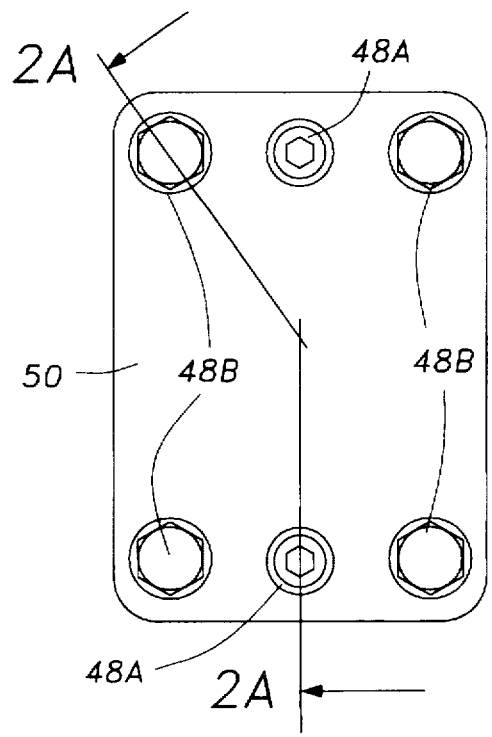
FIG. 2B is an outer view of one portion of the invention.

As shown in FIG. 2B, there are preferably six bolts. Four are normal threaded bolts 48B. Two of the bolts are shoulder bolts 48A having dowel-like unthreaded portions. The surface 51 of the transmission bell housing 46 that is abutted by shoulder 50 is machined to insure proper positioning of the block housing 37. The shoulder bolts 48A also insure proper positioning of the housing 37. The centers of the holes that receive the shoulder bolts 48A are cut such that a line drawn through their centers is parallel to the center axis of the shaft. These features in combination insure that the piston axis is parallel to the central shaft axis. Other structure, such as a curved surface abutting the shoulder 50, and the shoulder 50 having a mating curved surface, could also be utilized to achieve the precise positioning of the pistons relative to the central shaft. The main inventive feature here is that the mounting of the block or housing 37 insures that the piston axis is parallel to the central shaft axis.

Figure 3:
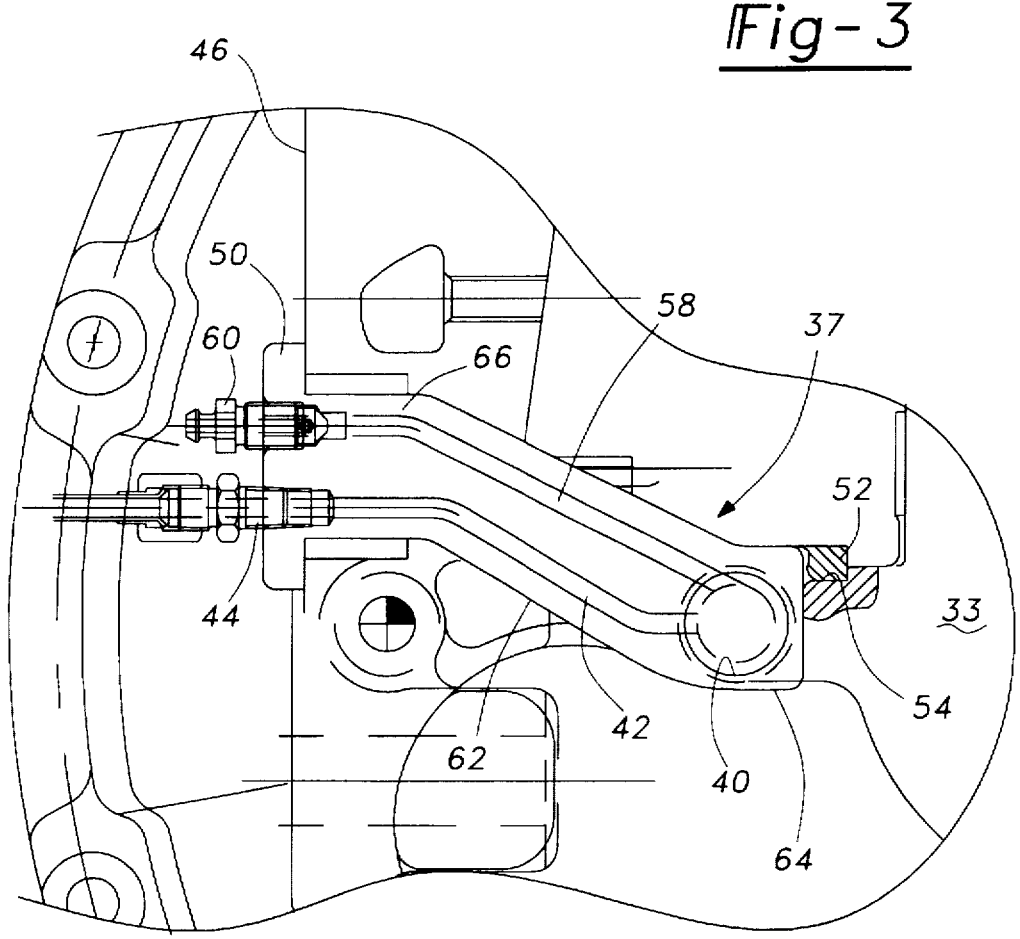
FIG. 3 is a cross-sectional view through a portion of the FIG. 2A cross-section.

As shown in FIG. 3, the single block housing 37 includes an angled structure such that it can be easily brought into the proper position. The guiding surface 52 is received on the guiding surface 54, such that clutch bearing 33 is properly guided. A second fluid passage 58 is connected to a vent 60 and is also formed integrally within the one-piece block housing 37. Air within the cylinder bore 40 can thus be vented outwardly as required.

A central angled portion 62 of the one-piece housing 37 connects an inner end 64 which includes the piston bore 40 to the outer end 66 which is positioned adjacent to shoulder 50. The angled structure of the one-piece block 37 facilitates the insertion and removal of the housing into the transmission bell housing 46.

Figure 4:
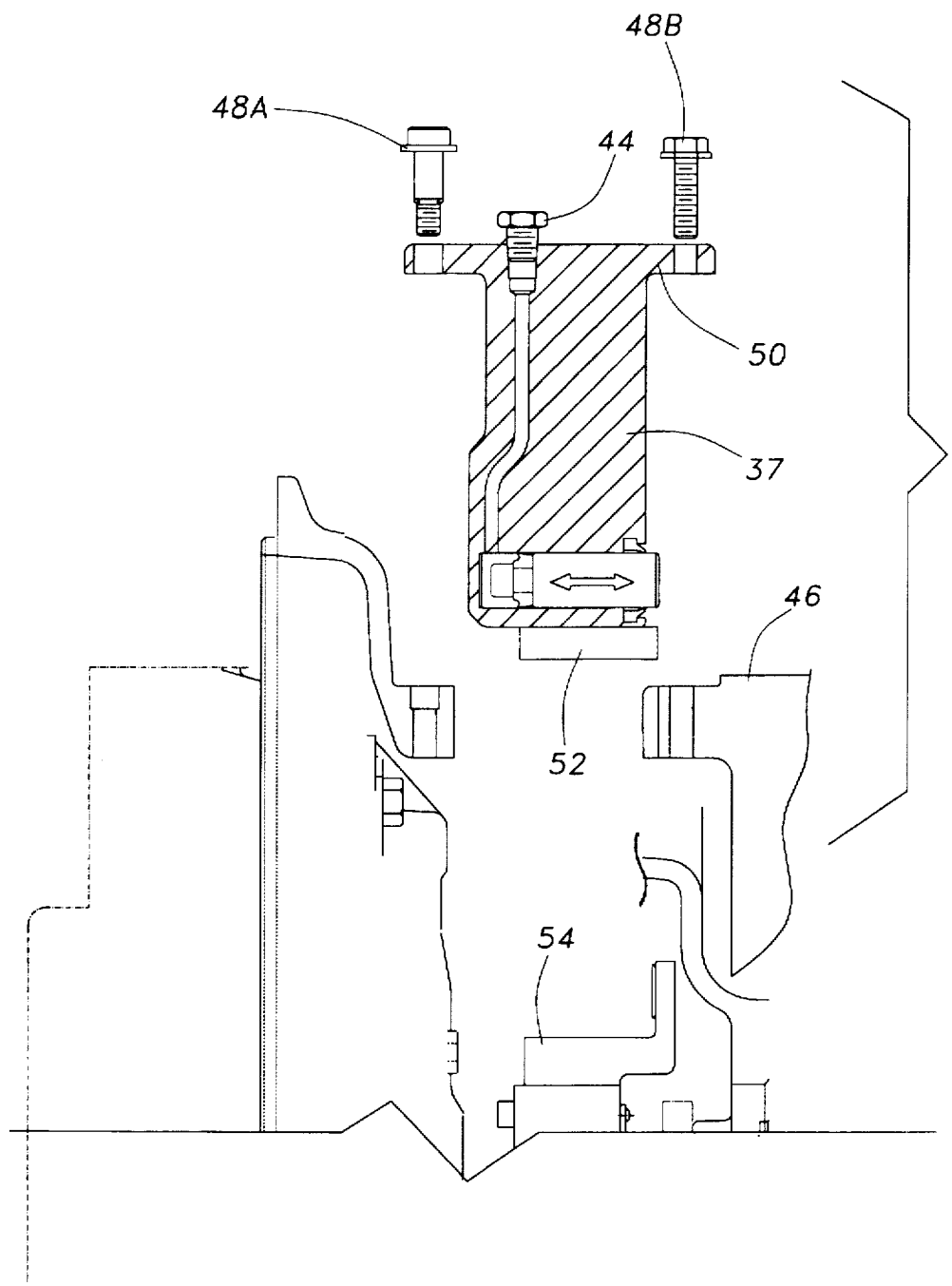
FIG. 4 is an assembly view showing the connection of the hydraulic cylinder housing.

As shown in FIG. 4, the one-piece housing 37 is easily moved into the opening in the outer transmission bell housing 46 side wall. Simply, once the clutch members have been inserted within the outer transmission bell housing 46, the one-piece block 37 can be moved radially into the side wall opening. The guiding surfaces 52 and 54 facilitate the proper location of the cylinder housing 37 within the housing 46. Bolts 48A and 48B can then secure the cylinder housing 37 to the outer transmission bell housing 46. The fluid connection to connection 44 can then be easily made, completing the attachment of the hydraulic cylinders to the clutch assembly 20. At the same time, the cylinder can be vented or bled after attachment through passages 58 and 60. In the prior art, bleeding must occur prior to assembly of the cylindrical housings within the transmission bell housing. This invention provides a great simplification over the prior art structure which required an operator to reach within the clutch housing and connect the fluid lines and the hydraulic cylinder to the clutch housing.

Figure 5:
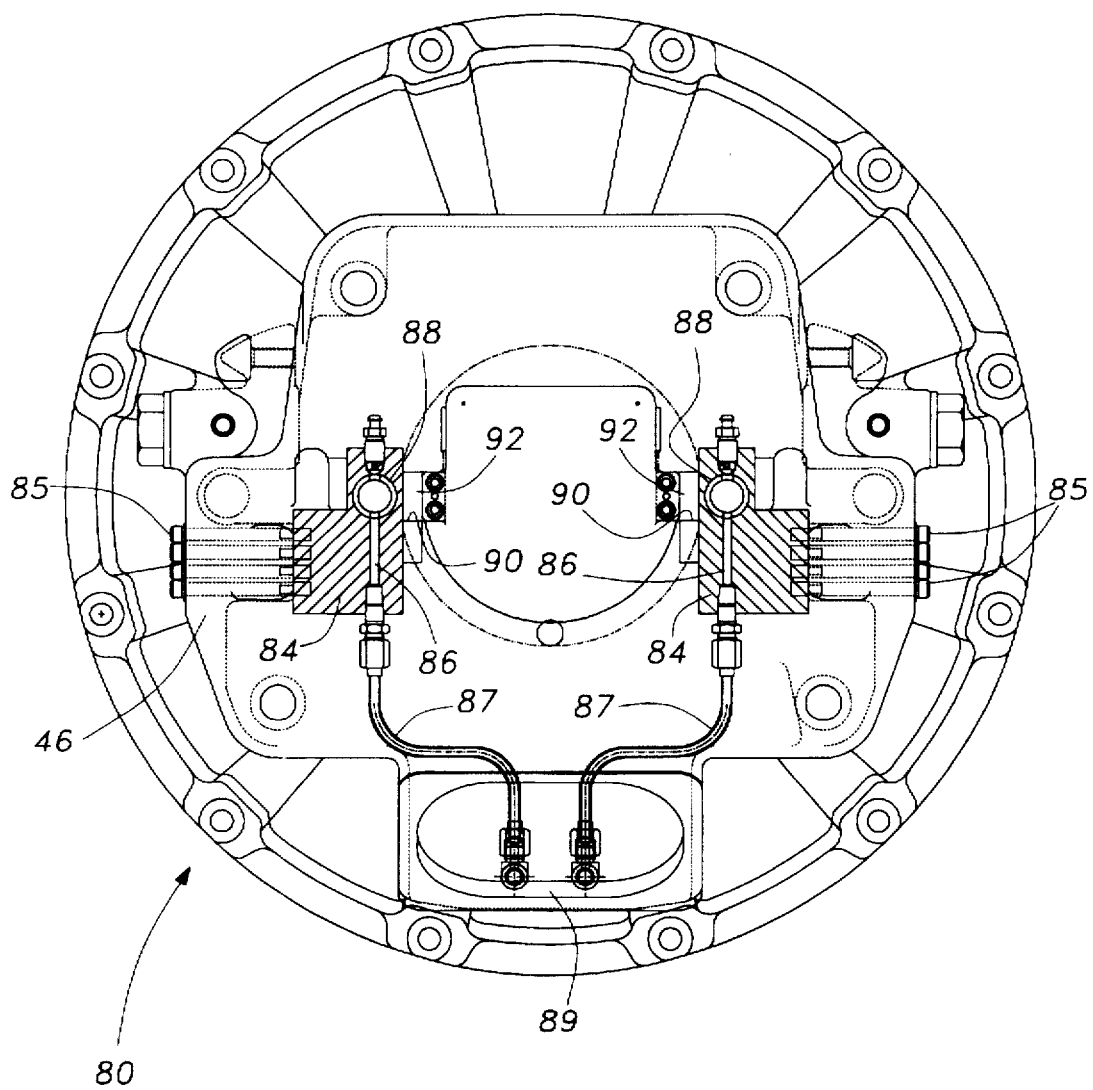
FIG. 5 shows a second embodiment hydraulic cylinder housing.

FIG. 5 shows a second embodiment 80. In embodiment 80, the one-piece hydraulic cylinder housings 84 are bolted within the outer clutch housing 46 through bolts 85. As shown, the fluid passages 86 are also formed within housings 84, and lead to a fluid line 87 extending outwardly through the housing at an opening 89. The piston bore 88 is a machined bore as in the prior embodiment. A guiding surface 90 is formed on an inner side, and guides the surface 92 from the clutch plate. Structures to insure that the pistons have an axis parallel to the axis of the shaft are also preferably included with this embodiment.

Although the invention is preferably used with hydraulic fluid, other fluid such as air may be used.

Preferred embodiments of this invention have been disclosed, however, a worker of ordinary skill in the art would recognize that certain modifications will come within the scope of this invention. For that reason, the following claims should be studied to determine the true scope and content of this invention.

I claim:

1. A fluid actuated clutch comprising:
   an outer housing;
   at least one clutch disk to selectively drive a shaft;
   at least one plate to be selectively brought into contact with said disk, said plate being selectively driven by a source of drive;
   an actuation structure for selectively bringing said disk into contact with said plate, said actuation structure including a clutch bearing selectively axially movably between contact and non-contact positions, said actuation structure further including a plurality of fluid operated pistons for moving said clutch bearing between said clutch and non-contact positions;
   said pistons being received in a cylinder housing, said cylinder housing being mounted into said outer housing, and connected directly to said outer housing; and
   said cylinder housing being connected to a side wall of said outer housing, said cylinder housing connected to said outer housing side wall, and extending through said side wall in a first direction, and said pistons moving within said cylinder housing in a second direction which is generally perpendicular to said first direction.

2. A clutch as recited in claim 1, wherein said cylinder housings extend into openings in the side of said outer housing and are bolted to said outer housing.

3. A clutch as recited in claim 2, wherein said housings include an outer shoulder received outwardly of said outer housing and which is bolted to said outer housing.

4. A clutch as recited in claim 3, wherein a fluid connection is positioned outwardly of said shoulder such that a fluid source can be connected to said connection at a location outwardly of said outer housing.

5. A clutch as recited in claim 2, wherein said cylinder housing includes a bore for receiving said piston, said bore being a machined bore formed within said cylinder housing.

6. A clutch as recited in claim 5, wherein a fluid passage extends from said bore to said connection, said passage being formed within said cylinder housing.

7. A clutch as recited in claim 6, wherein an anti-rotation surface is formed on a portion of said cylinder housing positioned radially inwardly from said piston bore.

8. A clutch as recited in claim 1, wherein said cylinder housing is bolted to an inner surface of said outer housing.

9. A clutch as recited in claim 1, wherein said cylinder housing includes a machined bore for receiving said piston.

10. A clutch as recited in claim 9, wherein a fluid passage extends from said bore to an outer portion of said cylinder housing to be connected to a source of fluid.

11. A fluid actuated clutch comprising:

an outer housing;

at least one clutch disk to selectively drive a shaft;

at least one plate to be selectively brought into contact with said disk;

an actuation structure for selectively bringing said disk into contact with said plate to transfer rotation from said plate to said disk, said actuation structure including a clutch bearing selectively movable between contact and non-contact positions, said actuation structure further including a plurality of fluid controlled pistons for moving said clutch bearing between said contact and non-contact positions;

said pistons each being received in a cylinder housing, said cylinder housings including an outer surface to be connected to said outer housing, said cylinder housings each extending through an opening in a side wall of said outer housing, and an outer shoulder of said cylinder housings being connected to an outer face of said outer housing around said openings; and said cylinder housing being connected to a side wall of said outer housing, said cylinder housing connected to said outer housing side wall, and extending through said side wall in a first direction, and said pistons moving within said cylinder housing in a second direction which is generally perpendicular to said first direction.

12. A clutch as recited in claim 11, wherein said cylindrical housings being bolted to said outer housings by bolts passing through said outer shoulder.

13. A clutch as recited in claim 11, wherein a fluid connection is positioned outwardly of said shoulder such that a fluid source can be connection is said connection at a location spaced outwardly of said outer housing.

14. A clutch as recited in claim 11, wherein said cylinder housing includes a bore for receiving said piston, said bore being a machined bore formed within said cylinder housing.

15. A clutch as recited in claim 14, wherein a fluid passage extends from said bore to said connection, said passage being machined within a one-piece block forming said cylinder housing.

16. A clutch as recited in claim 11, wherein an anti-rotation surface is formed on a portion of said cylinder housing positioned radially inwardly from said piston bore.

17. A clutch as recited in claim 11, wherein said fluid is a hydraulic fluid.

\* \* \* \* \*